United States Patent
Dang et al.

(10) Patent No.: US 12,399,720 B2
(45) Date of Patent: Aug. 26, 2025

(54) APPARATUS AND METHOD

(71) Applicant: Arm Limited, Cambridge (GB)

(72) Inventors: Maochang Dang, Shanghai (CN); Li Hu, Shanghai (CN); Yanqiu Wu, Shanghai (CN)

(73) Assignee: Arm Limited, Cambridge (GB)

( * ) Notice: Subject to any disclaimer, the term of this patent is extended or adjusted under 35 U.S.C. 154(b) by 575 days.

(21) Appl. No.: 17/455,606

(22) Filed: Nov. 18, 2021

(65) Prior Publication Data
US 2022/0171630 A1    Jun. 2, 2022

(30) Foreign Application Priority Data

Nov. 27, 2020   (GB) .................................... 2018697

(51) Int. Cl.
| | |
|---|---|
| G06F 9/46 | (2006.01) |
| G06F 9/30 | (2018.01) |
| G06F 9/38 | (2018.01) |
| G06F 9/48 | (2006.01) |
| G06F 9/50 | (2006.01) |
| G06T 1/20 | (2006.01) |

(52) U.S. Cl.
CPC ........ *G06F 9/3856* (2023.08); *G06F 9/30087* (2013.01); *G06F 9/3838* (2013.01); *G06F 9/4881* (2013.01); *G06F 9/5038* (2013.01); *G06T 1/20* (2013.01)

(58) Field of Classification Search
CPC .... G06F 9/4881; G06F 9/5038; G06F 9/3856; G06F 9/30087; G06F 9/3838; G06T 1/20
See application file for complete search history.

(56) References Cited

U.S. PATENT DOCUMENTS

| | | | | |
|---|---|---|---|---|
| 11,468,304 | B1* | 10/2022 | Diamant | G06F 15/8046 |
| 2009/0202173 | A1* | 8/2009 | Weiss | H04N 1/622 |
| | | | | 382/276 |
| 2016/0055608 | A1* | 2/2016 | Frascati | G06T 15/005 |
| | | | | 345/522 |
| 2018/0300933 | A1* | 10/2018 | Burke | G06F 9/4881 |
| 2021/0081207 | A1* | 3/2021 | Shahar | G06F 9/522 |

FOREIGN PATENT DOCUMENTS

EP    3392764 A1    10/2018

* cited by examiner

*Primary Examiner* — Tammy E Lee
(74) *Attorney, Agent, or Firm* — NIXON & VANDERHYE P.C.

(57) ABSTRACT

A method comprising a set of discrete rendering tasks having an initial task order to be executed by a graphics processing unit, a GPU, detecting a dependency between a dependency group of two or more rendering tasks, a dependency being that one or more rendering tasks of the dependency group earlier in the initial task order depend upon an execution result of one or more rendering tasks of the dependency group later in the initial task order; ordering the set of rendering tasks, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issuing the ordered set of rendering tasks to the GPU for execution.

11 Claims, 5 Drawing Sheets

APPARATUS AND METHOD

CROSS-REFERENCE TO RELATED APPLICATIONS

This application claims priority pursuant to 35 U.S.C. 119(a) to United Kingdom Patent Application No. 2018697.9, filed Nov. 27, 2020, which application is incorporated herein by reference in its entirety.

BACKGROUND

This disclosure relates to apparatus and methods.

In the field of computer graphics, it is known to use a graphics processing unit, or in other words a specialised processor, to implement graphics processing commands (which may be referred to as "draw calls") prepared by another processor.

The graphics processing commands needs to be executed in a dependency order so that a command which relies on source information prepared by or modified by another command is executed after that other command has completed.

SUMMARY

In an example arrangement there is provided a method comprising:

for a set of discrete rendering tasks having an initial task order to be executed by a graphics processing unit, GPU, detecting a dependency between a dependency group of two or more rendering tasks of the set of rendering tasks, a dependency being such that one or more rendering tasks of the dependency group earlier in the initial task order depend upon an execution result of one or more rendering tasks of the dependency group later in the initial task order;

ordering the set of rendering tasks into an ordered set of rendering tasks, in which, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issuing the ordered set of rendering tasks to the GPU for execution.

In another example arrangement there is provided computer software which, when executed by a computer, causes the computer to perform such a method.

In another example arrangement there is provided a machine-readable non-transitory storage medium which stores such computer software.

In another example arrangement there is provided apparatus comprising:

processing circuitry configured to:

detect, for a set of discrete rendering tasks having an initial task order to be executed by a graphics processing unit, GPU, a dependency between a dependency group of two or more rendering tasks of the set of rendering tasks, a dependency being such that one or more rendering tasks of the dependency group earlier in the initial task order depend upon an execution result of one or more rendering tasks of the dependency group later in the initial task order;

order the set of rendering tasks into an ordered set of rendering tasks, in which, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issue the ordered set of rendering tasks to the GPU for execution.

Further respective aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
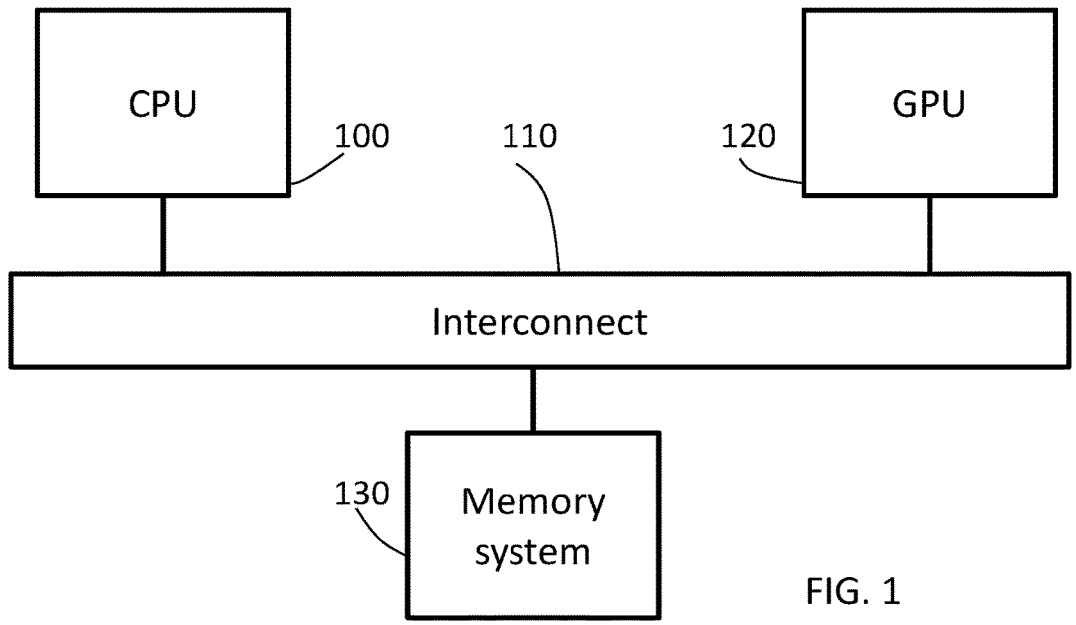
FIG. 1 schematically illustrates a data processing apparatus.

Before discussing the embodiments with reference to the accompanying figures, the following description of embodiments is provided.

An example embodiment provides a method comprising:

for a set of discrete rendering tasks having an initial task order to be executed by a graphics processing unit, GPU, detecting a dependency between a dependency group of two or more rendering tasks of the set of rendering tasks, a dependency being such that one or more rendering tasks of the dependency group earlier in the initial task order depend upon an execution result of one or more rendering tasks of the dependency group later in the initial task order;

ordering the set of rendering tasks into an ordered set of rendering tasks, in which, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issuing the ordered set of rendering tasks to the GPU for execution, for example as an atomic set of rendering tasks.

Example embodiments can potentially reduce the latency and/or power consumption of the performance of rendering tasks by reordering the tasks so as to lead to fewer dependency events having to be resolved, and in turn fewer instances of tasks having to wait until other tasks are complete.

In example arrangements, the detecting, ordering and issuing steps may be performed at a central processing unit, CPU, separate to the GPU, for example by executing a GPU driver to implement the detecting, ordering and issuing steps. In more detail, in example embodiments, the role of the CPU may be as follows: the rendering tasks are generated at the CPU; and the CPU receives data from the GPU representing an execution result of executing the rendering tasks at the GPU.

In example arrangements, the detecting step may comprise generating synchronisation instructions comprising at least: a wait instruction indicative of a rendering task in the initial task order which is required to wait for execution of one or more rendering tasks later in the initial task order; and a synchronisation instruction indicative that a rendering task associated with a wait instruction may now proceed to execution.

In at least some examples, the ordering step comprises: detecting a dependency group comprising rendering tasks associated with pairs of wait and synchronisation instructions; and ordering the detected rendering tasks of the dependency group such that within the dependency group, a rendering task associated a wait instruction is ordered after a rendering task associated with a respective synchronisation instruction.

Although the process discussed above may be performed once, in other examples it may be performed iteratively, for example by defining the set of rendering instructions as an initial set of rendering instructions; and iteratively performing the detecting and ordering steps with respect to the set of rendering instructions and adding further successive rendering instructions, in the initial task order, to the set of rendering instructions, until the addition of a further rendering instruction would prevent completion of the ordering step.

Another example embodiment provides computer software which, when executed by a computer, causes the computer to perform such a method.

Another example embodiment provides a machine-readable non-transitory storage medium which stores such computer software.

Another example embodiment provides apparatus comprising:

processing circuitry configured to:

detect, for a set of discrete rendering tasks having an initial task order to be executed by a graphics processing unit, GPU, a dependency between a dependency group of two or more rendering tasks of the set of rendering tasks, a dependency being such that one or more rendering tasks of the dependency group earlier in the initial task order depend upon an execution result of one or more rendering tasks of the dependency group later in the initial task order;

order the set of rendering tasks into an ordered set of rendering tasks, in which, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issue the ordered set of rendering tasks to the GPU for execution.

The apparatus may also comprise the GPU to execute the ordered set of rendering tasks.

Referring now to the drawings, FIG. 1 schematically illustrates a data processing system comprising a processing element or central processing unit (CPU) 100, connected via interconnect circuitry 110 to a graphics processing unit (GPU) 120 and to a memory 130.

The CPU 100 performs general-purpose computation, which in this example arrangement refers to computational tasks which are not performed by the GPU 120. The GPU 120 is itself a specialised circuitry which is designed and implemented to perform computation relating to the creation of images very efficiently. The image information generated by the GPU 120 may output to a display device or display device driver, not shown in FIG. 1.

GPUs are not restricted to performing image-based operations and can in fact be used for other processing tasks such as implementing machine learning or artificial intelligence applications. However, several aspects of the functionality is typically well-suited to executing rendering, or the like, in order to generate image data.

In operation, the CPU 100 would typically generate a set of GPU processing tasks which are provided to the GPU 120 via the interconnect 110 for execution. Task data, such as data defining the tasks, and/or data to be processed by the tasks, may be stored in the memory system 130 to allow the GPU 120 to access each task and its associated task data in an execution order and the GPU 120 may similarly store the results of its computation in the memory system 130.

Figure 2:
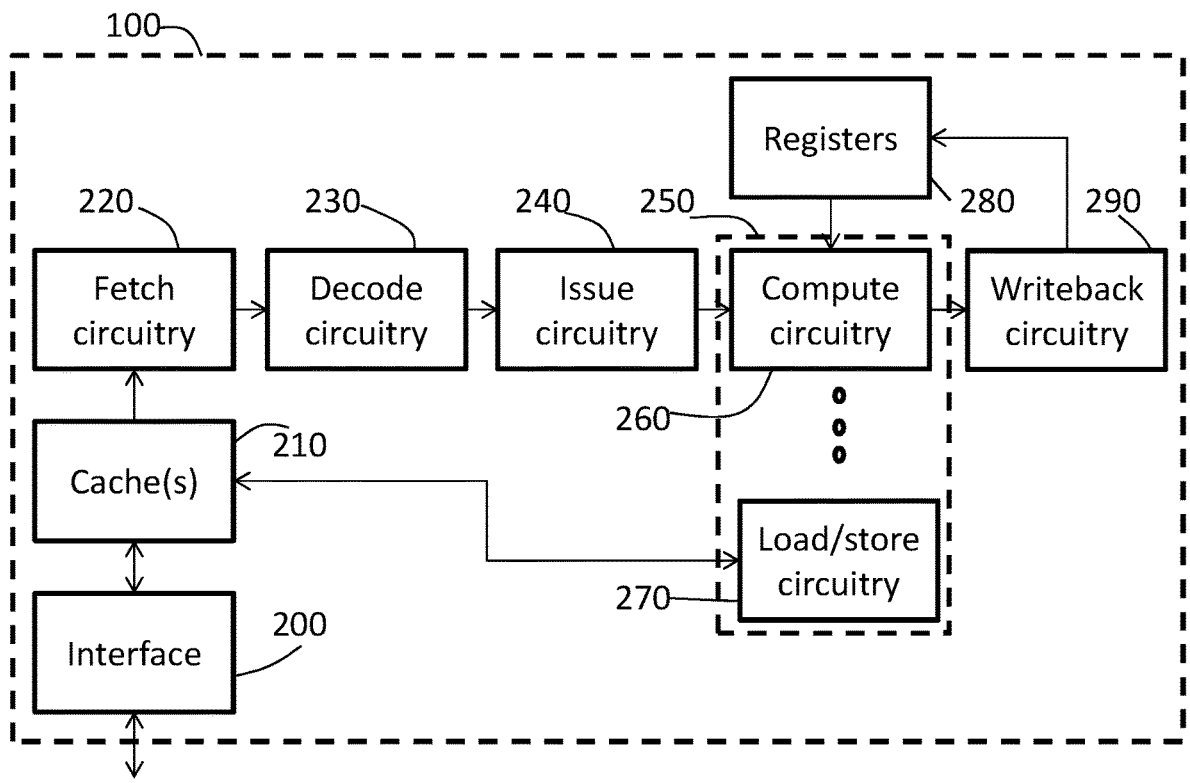
FIG. 2 schematically illustrates a central processing unit.

FIG. 2 schematically illustrates an example structure of the CPU 100. An interface 200 provides interfacing with the interconnect 110 for the passing of data, instructions or the like to the CPU 100 or the communication of information from the CPU 100 to another node connected to the interconnect 110. One or more cache memories such as a level 1 cache memory are provided and are schematically shown as caches 210.

Fetch circuitry 220 controls the fetching of instructions from the memory system 130 via the interface 200 and the caches 210. The fetched instructions are passed to decode circuitry 230 where they are decoded for execution and passed to issue circuitry 240. The issue circuitry 240 issues the decoded instructions to an execution unit 250 comprising various circuitries including (in this example) compute circuitry 260 to perform computation and load/store circuitry 270 which controls the loading of data for use in the computations and the storage of data back to the memory system 130. In operation, the compute circuitry 260 refers to values held by one or more registers 280 and, where necessary, writes new values to those registers using writeback circuitry 290.

In the context of the present example embodiments, the CPU performs various instructions to prepare a set of GPU processing tasks for execution by the GPU 120. Examples of this process will be discussed in more detail below.

Figure 3:
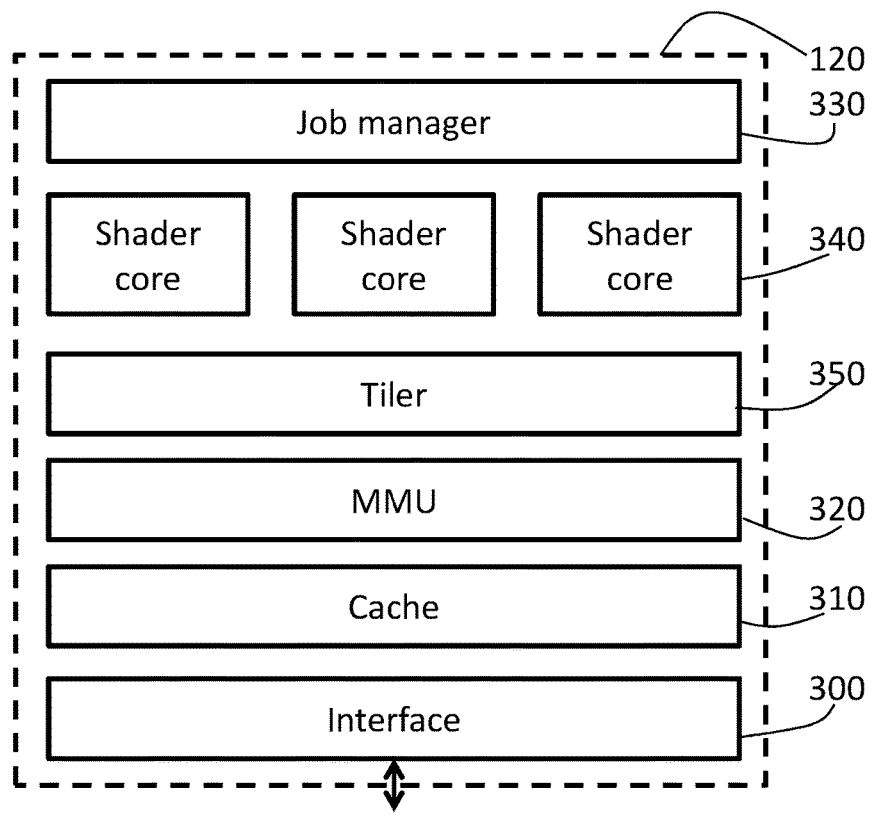
FIG. 3 schematically illustrates a graphics processing unit.

FIG. 3 schematically illustrates an example structure of the GPU 120, again comprising an interface 300 for retrieving data and instructions from the interconnect 110 and providing data such as processing results back to the interconnect 110, and a cache 310 for storing data and/or instructions for input or processed data for output. A memory management unit (MMU) 320 can perform address translation where this is required.

A job manager 330 controls the execution of processing tasks or jobs established by the CPU 110, with the GPU-specific execution been performed by a set of shader cores 340 and tiler circuitry 350.

The shader cores are processing units specifically optimised or designed for handling instructions, for example in the form of shader code in order to manipulate the pixels and polygon vertices within an image so as to render portions of that image.

The tiler circuitry oversees the division of the GPU rendering operations into those corresponding to discrete regions or tiles of the rendered image. This process can reduce the instantaneous memory and data transfer requirements which occur during the rendering process by the GPU 120.

Figure 4:
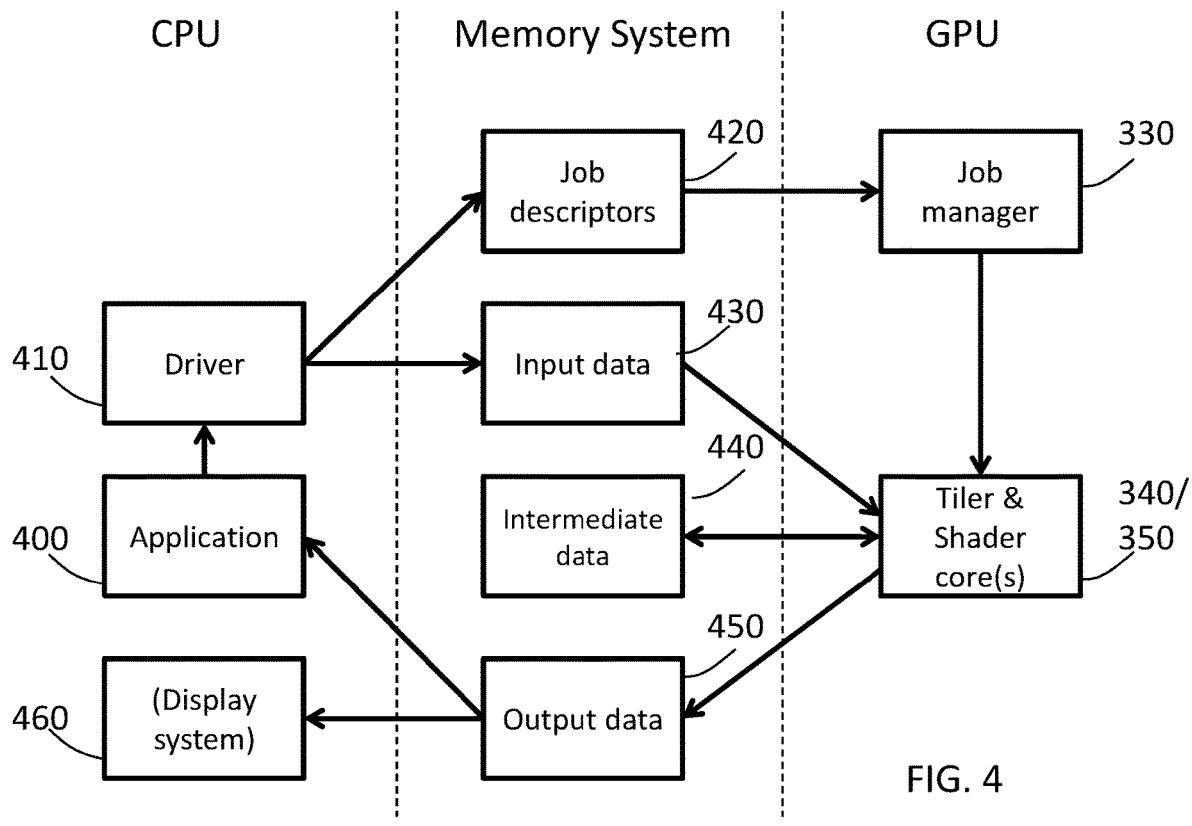
FIG. 4 schematically illustrates an example data flow.

FIG. 4 schematically illustrates an example of data flow within the apparatus of FIG. 1. The diagram is divided into three vertically arranged sections, representing operations at the CPU, the memory system and the GPU. It is of course assumed that the interconnect circuitry is involved in communication between these various nodes.

At the CPU, drawn at the left side of FIG. 4, application code 400 has (amongst other functions those brackets the role of generating GPU tasks for execution by the GPU. These are processed by execution of a driver 410 specific to the GPU in use and are stored in the memory system (central portion of FIG. 4) as a set of job descriptors 420 and, where required, input data 430 to be processed by the GPU tasks.

The GPU (drawn at the right side of FIG. 4) job manager 330 retrieves the job descriptors 420 and control's execution of GPU tasks by the tiler and shader cores 340, 350. These can generate and retrieve intermediate data 440 which may be held at the memory system and can generate output data 450 to be stored by the memory system and in turn read out by one or both of the application 400 and a display system 460 provided at or by the CPU.

Therefore, in examples, the rendering tasks are generated at the CPU (for example, by the application 400 and/or the driver 410); and the CPU receives data from the GPU representing an execution result of executing the rendering tasks at the GPU.

The program code implementing the application 400 and/or the driver 410 provides an example of computer software which, when executed by a computer, causes the computer to perform the methods discussed here. The memory system 130 and/or the caches 210 provide an example of a machine-readable non-transitory storage medium which stores such computer software.

Example operations illustrating problem to be addressed will be described below.

Figure 5:
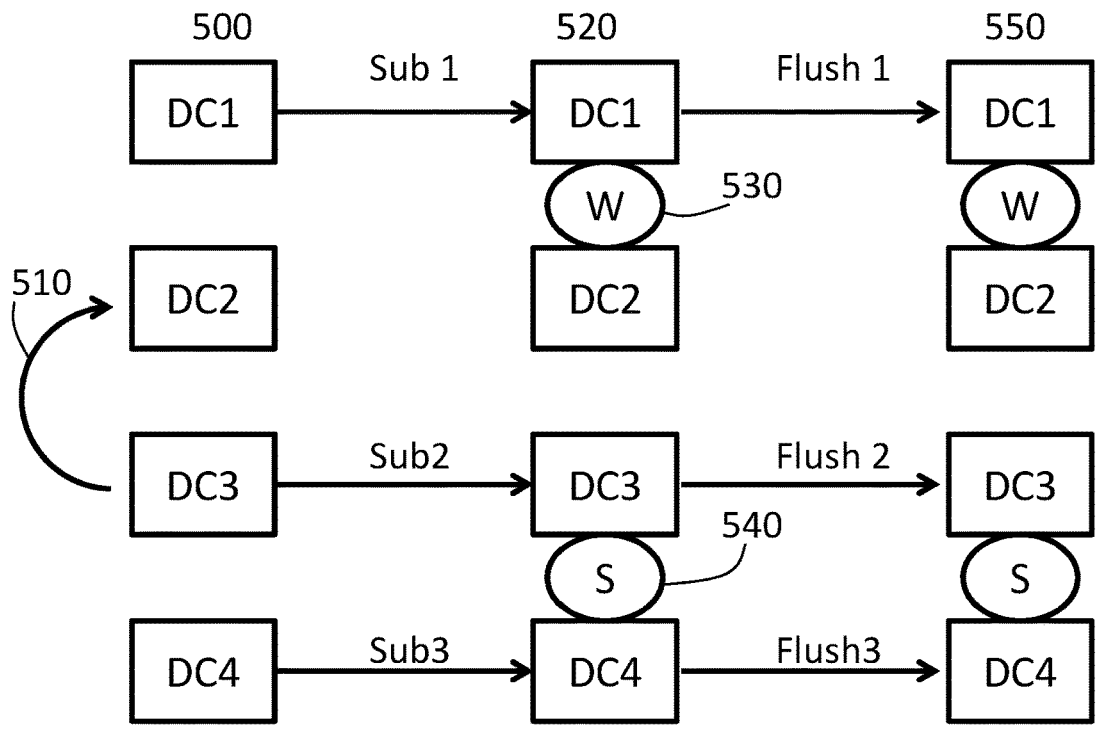
FIG. 5 schematically illustrates a set of GPU tasks.

Example Situation—FIG. 5

Referring to FIG. 5, a series of so-called "draw calls" (DCn) is illustrated in a left-hand column 500. The draw calls are prepared by the CPU 100 for execution by the GPU 120 and the numerical ordering of the draw calls DC1 . . . DC4 relates to a logical ordering of rendering tasks prepared by the CPU 100. The ordering of the draw calls runs vertically downwards as drawn.

A so-called dependency 510 is illustrated. This represents an example of a situation in which a numerically earlier draw call (DC2 in this example) relies upon reading resource data such as a graphical texture which is written to or modified by a later draw call (DC3 in this example). In order to handle the situation, when the CPU prepares a set 520 of enqueued commands to be "flushed" or otherwise provided to the GPU as a set 550 of GPU commands for execution, the CPU implements them as three "submissions" (Sub n) in which a first submission comprises DC1 and DC2, a second submission comprises DC3 and a third submission comprises DC4. The CPU handles the dependency 510 by inserting so-called "dependency events". In the example shown, these comprise a "wait" (W) event 530 between DC1 and DC2, and a "signal" (S) 540 between DC3 and DC4. In operation, execution of submission 1 by the GPU will pause at the wait event 530. Execution of submission 2 can proceed so that when the draw call DC3 has completed the signal event 540 provides a signal to allow release of the wait event 530 so that DC2 may then proceed.

This therefore provides an example of generating synchronisation instructions comprising at least: a wait instruction indicative of a rendering task in the initial task order which is required to wait for execution of one or more rendering tasks later in the initial task order; and a synchronisation instruction indicative that a rendering task associated with a wait instruction may now proceed to execution.

Although the use of dependency events of the type discussed above allow rendering operations to be completed in the correct order, the dependency events can themselves reduce the overall rendering performance because processing has to be paused at various stages. This can have a consequential negative effect on power consumption.

To address this matter, example embodiments can provide techniques for reordering GPU command streams prepared by the CPU, for example using processing to be implemented by code executing as part of a GPU driver 410. So, in the context of FIG. 4, the application 400 would prepare the initial set of GPU tasks and the reordering would be performed by the GPU driver 410. However, there will be appreciated that the reordering could be performed instead by the application 400.

Example Reordering Process

Figure 6:
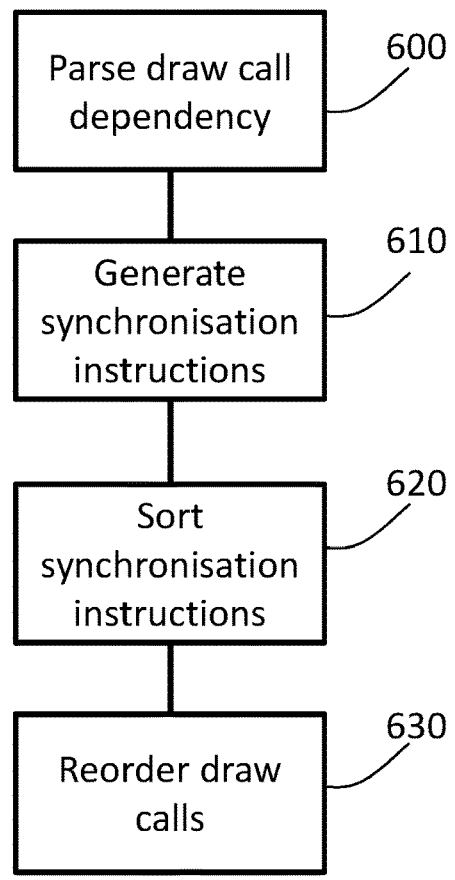
FIG. 6 is a schematic flowchart illustrating a method.

Referring to FIG. 6, in example process involves parsing, at a step 600, the resource reads/writes dependency of a set of draw calls in order to generate (at a step 610) synchronisation instructions such as synchronisation event waits 530 and synchronisation event signals 540 as discussed above. The steps 600, 610 represent the process is performed in generate the set of draw calls 500 and the submissions 520 of FIG. 5.

Further steps 620, 630, however, are now provided in example arrangements. As discussed above, these may be performed by the GPU driver 410 in at least some examples.

At the step 620, the synchronisation instructions are sorted according to the dependent order of the occurrence of the synchronisation instruction. An example will be provided in FIG. 7 below.

At the step 630, the draw calls are rearranged or reordered based on the order of the sorted synchronisation instructions. An aim here is to increase the maximum size of a group or number of draw calls that can be executed in order without internal synchronisation events between draw calls in that group. Similarly, an aim is to achieve the situation for each such draw call group that the group has only one external synchronisation point. Again, this will be discussed further with reference to the example of FIG. 7 below.

Example of Draw Call Reordering

In summary, the reordering involves detecting a dependency group comprising rendering tasks associated with pairs of wait and synchronisation instructions; and ordering the detected rendering tasks of the dependency group such that within the dependency group, a rendering task associated a wait instruction is ordered after a rendering task associated with a respective synchronisation instruction.

Figure 7:
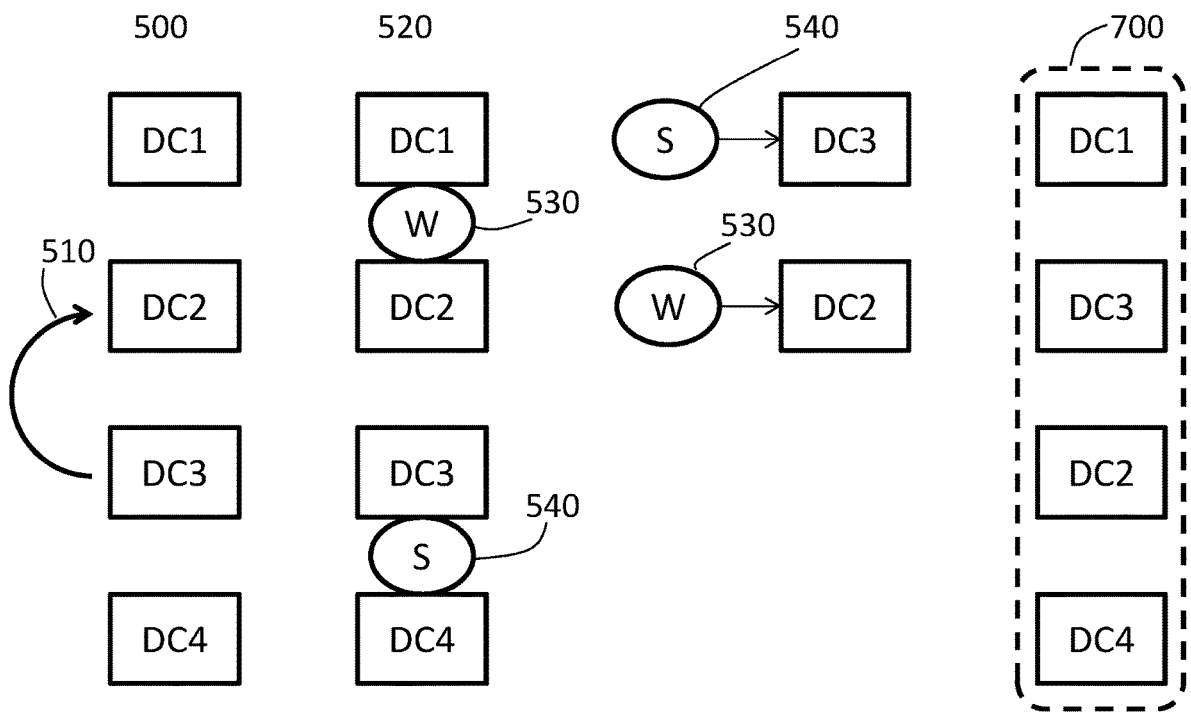
FIG. 7 schematically illustrates a set of GPU tasks.

Referring to FIG. 7, the set 500 of draw calls is generated as before, for example by the application 400, and includes the dependency 510. This process corresponds to the step 600 of FIG. 6. The step 610 of FIG. 6 provides for the generation of synchronisation instructions 530, 540 in the parsed set 510 of draw calls.

The sorting instruction of the step 620 will now be described.

Of the parsed set 510 of draw calls including the synchronisation instructions, the synchronisation instructions themselves are reordered so that signal events such as the event 540 are ordered to be before wait events such as the event 530 which would otherwise wait for that signal event.

Once the synchronisation events are reordered, the same reordering is applied to the associated draw calls. Here, the draw call "associated with" a signal event is the draw call, for which the completion of that draw call would lead to the issue of the respective signal. The draw call "associated with" a wait event is the draw call which cannot start until the wait event has been resolved.

So, in the example of FIG. 7, DC3 is associated with the signal event 540 and DC2 is associated with the wait event 530.

The reordering of draw calls of the step 630 is therefore, in this schematic example, to reorder DC3 to be before DC2. The result is an atomic command stream 700 comprising, in order, [DC1, DC3, DC2, DC4] with no internal synchronisation events within the atomic command stream 700.

Once the reordering has taken place, the associated synchronisation events, insofar as they relate to synchronisation with respect to other draw calls within the atomic group 700, can be deleted or removed. The atomic group 700 is then used to build a command stream for execution by the GPU 120. Each atomic group 700 requires only to synchronisation points: a wait event at the beginning of the atomic group 702 response to completion of the previous atomic group, and a signal event at the end of the atomic group to notify the next atomic group to start.

Note that the reordering can be carried out iteratively, so that after a first iteration the resulting atomic groups may then be reordered so as to remove or reduce dependencies between the atomic groups, in turn creating larger atomic groups. This process can be continued until no further increase in the size of the atomic groups can be achieved. This provides an example of defining the set of rendering instructions as an initial set of rendering instructions; and iteratively performing the detecting and ordering steps with respect to the set of rendering instructions and adding further successive rendering instructions, in the initial task order, to the set of rendering instructions, until the addition of a further rendering instruction would prevent completion of the ordering step.

Whether the process is carried out once or on alliterative basis, the end result is to issue the ordered set of rendering tasks to the GPU as an atomic set of rendering tasks.

Summary Method

Figure 8:
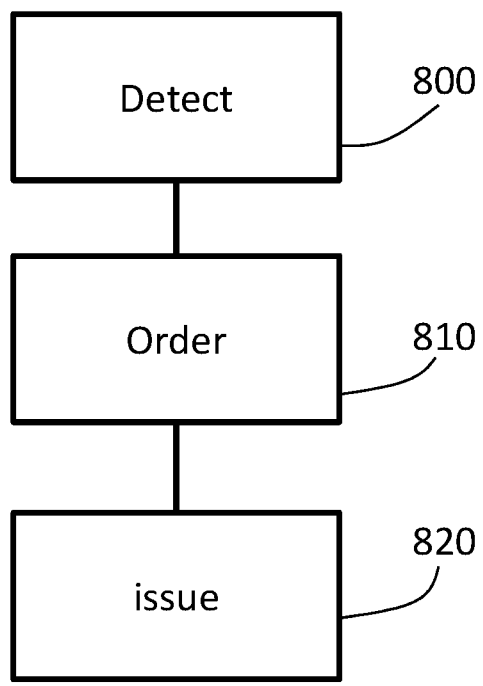
FIG. 8 is a schematic flowchart illustrating a method.

FIG. 8 schematically illustrates an example method comprising:

for a set of discrete rendering tasks having an initial task order to be executed by a graphics processing unit, GPU, detecting (at a step 800) a dependency between a dependency group of two or more rendering tasks of the set of rendering tasks, a dependency being such that one or more rendering tasks of the dependency group earlier in the initial task order depend upon an execution result of one or more rendering tasks of the dependency group later in the initial task order;

ordering (at a step 810) the set of rendering tasks into an ordered set of rendering tasks, in which, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issuing (at a step 820) the ordered set of rendering tasks to the GPU for execution, for example as an atomic set of rendering tasks.

In examples, executing the detecting 800, ordering 810 and issuing 820 steps at a central processing unit, CPU, separate to the GPU, for example by a GPU driver.

Summary Apparatus

In connection with the techniques described above, the apparatus of FIG. 1 provides an example of apparatus comprising:

processing circuitry 100 configured to:

detect, for a set of discrete rendering tasks having an initial task order to be executed by a graphics processing unit, GPU, 120, a dependency between a dependency group of two or more rendering tasks of the set of rendering tasks, a dependency being such that one or more rendering tasks of the dependency group earlier in the initial task order depend upon an execution result of one or more rendering tasks of the dependency group later in the initial task order;

order the set of rendering tasks into an ordered set of rendering tasks, in which, in the ordered set of rendering tasks, a dependency group of rendering tasks is ordered such that rendering tasks of a dependency group which depend upon one or more other tasks of the dependency group are ordered after the one or more other tasks upon which those rendering tasks depend; and issue the ordered set of rendering tasks to the GPU for execution.

The apparatus may also comprise the GPU 120 to execute the ordered set of rendering tasks.

General Notes

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A method comprising:
for a set of rendering tasks having an initial task order to be executed by a graphics processing unit, GPU, detecting a dependency between a dependency group of two or more of the set of rendering tasks, the dependency being such that one or more of the set of rendering tasks of the dependency group earlier in the initial task order depend upon an execution result of one or more of the rendering tasks of the dependency group later in the initial task order;
ordering the set of the rendering tasks into an ordered set of the rendering tasks, in which, in the ordered set of the rendering tasks, the dependency group is ordered such that the rendering tasks of the dependency group which depend upon one or more other of the rendering tasks of the dependency group are ordered after the one or more other of the rendering tasks upon which those of the rendering tasks depend; and issuing the ordered set of the rendering tasks to the GPU for execution, wherein the detecting step comprises generating:
- a wait instruction indicative of a waiting rendering task in the initial task order which is required to wait for execution of one or more later rendering tasks later in the initial task order; and
- a synchronisation instruction indicative that the waiting rendering task is allowed to proceed to execution.

2. The method of claim 1, comprising:
executing the detecting, ordering and issuing steps at a central processing unit, CPU, separate to the GPU.

3. The method of claim 2, comprising:
executing a GPU driver to implement the detecting, ordering and issuing steps.

4. The method of claim 2, comprising:
generating the rendering tasks at the CPU; and
receiving, at the CPU, data from the GPU representing an execution result of executing the rendering tasks at the GPU.

5. The method of claim 1, in which the ordering step comprises:
detecting the dependency group comprising rendering tasks associated with pairs of wait and synchronisation instructions; and
ordering the detected rendering tasks of the dependency group such that within the dependency group, a second rendering task associated its wait instruction is ordered after a first rendering task associated with its respective synchronisation instruction.

6. The method of claim 1, comprising:
defining the set of rendering tasks as an initial set of rendering tasks; and
iteratively performing the detecting and ordering steps with respect to the set of rendering tasks and adding further successive rendering tasks, in the initial task order, to the set of rendering tasks, until the addition of a further rendering task would prevent completion of the ordering step.

7. The method of claim 1, in which the issuing step comprises:
issuing the ordered set of rendering tasks to the GPU as an atomic set of rendering tasks.

8. Computer software which, when executed by a computer, causes the computer to perform the method of any one of the preceding claims.

9. A machine-readable non-transitory storage medium which stores the computer software of claim 8.

10. Apparatus comprising:
processing circuitry configured to:
- detect, for a set of rendering tasks having an initial task order to be executed by a graphics processing unit, GPU, a dependency between a dependency group of two or more of the set of rendering tasks, a dependency being such that one or more of the set of rendering tasks of the dependency group earlier in the initial task order depend upon an execution result of one or more of the rendering tasks of the dependency group later in the initial task order;
- order the set of the rendering tasks into an ordered set of the rendering tasks, in which, in the ordered set of the rendering tasks, the dependency group is ordered such that the rendering tasks of the dependency group which depend upon one or more other of the rendering tasks of the dependency group are ordered after the one or more other of the rendering tasks upon which those of the rendering tasks depend; and
- issue the ordered set of the rendering tasks to the GPU for execution, wherein the processing circuitry is configured to detect the dependency by generating:
- a wait instruction indicative of a waiting rendering task in the initial task order which is required to wait for execution of one or more later rendering tasks later in the initial task order; and
- a synchronisation instruction indicative that the waiting rendering task is allowed to proceed to execution.

11. The apparatus of claim 10, comprising the GPU to execute the ordered set of rendering tasks.

* * * * *